United States Patent Office 3,705,085
Patented Dec. 5, 1972

3,705,085
METHOD FOR EXTRACTING AND SEPARATING ENZYMES
Jacques Guy Pelluet, Nesle, France, assignor to Societe Anonyme: Les Produits Organiques du Santerre Orsan, Paris, France
No Drawing. Filed July 24, 1970, Ser. No. 58,164
Claims priority, application France, Sept. 23, 1969, 6932369; Jan. 27, 1970, 7002833
Int. Cl. C12d *13/10;* C07g *7/028*
U.S. Cl. 195—66 R          5 Claims

ABSTRACT OF THE DISCLOSURE

A method for preparing an active enzyme powder from a culture of *Bacillus subtilis* which comprises the steps of:

(a) precipitating the enzyme from a nutrient broth of the purified culture by means of sodium sulphate,
(b) vacuum-filtering the resulting flocculate on a filter having a pre-treated filter bed using calcium sulphate dihydrate as a filtration adjuvant, and
(c) scraping a surface layer off the filter bed to obtain the dry product having a degree of activity determined by the thickness of the layer.

The powder may be used in detergent compositions.

---

This invention relates to the preparation of enzymatic compositions intended, for example, for incorporation in detergents and obtained by a process of fermentation in a pure culture, inter alia of *Bacillus subtilis*.

Known methods of extracting exo-enzymes from culture broths can be divided into three categories:

(a) precipitation by alcohols and ketones,
(b) precipitation by mineral salts, and
(c) selective absorption and desorption.

These methods can be used along or in combination with one another.

The alcohols and ketones used as precipitating agents include acetone, isopropyl alcohol, ethyl alcohol and methyl alcohol. Among precipitating agents consisting of mineral salts, the most frequently used substances are ammonium sulphate, sodium sulphate and magnesium sulphate. The use of absorbing agents such as alumina for selectively absorbing the enzymes to be extracted results in methods which generally have to be used in combination with one of the aforementioned fractionation methods. Whatever method of purification is chosen, however, it always has some disadvantage in operation.

Methods using a solvent as an extracting agent have an inadequate selectivity and they therefore yield impure products which have a low activity and which require further treatment before they are of commercial quality. If acetone is added to the medium to be treated all the insoluble organic substances (whether enzymatic or not) and most of the mineral salts are precipitated. Furthermore, the composition of the product obtained depends on the concentration of solvent in the medium. The quantities of precipitating agent used are always considerable, whether or not the fermented nutrient broths have been concentrated before treatment, and, moreover, the broths generally lose some of their activity if they are concentrated before treatment.

The methods of treating clarified broths with mineral salts have the advantage of being selective compared with the methods previously mentioned but they do not generally yield a highly active, pure enzymatic powder since it is difficult to isolate the flocculate obtained. The flocculate retains a considerable amount of the salt used to precipitate it, and also retains other impurities from the impregnation mother liquors. If, for example, ammonium sulphate is used as the precipitating agent, the powders obtained are rich in ammonium salt and if the product is incorporated without further treatment in alkaline detergent compositions, it gives them an unpleasant smell of ammonia. The use of other salts, such as magnesium sulphate or disodium sulphate, is not justified except in special cases where the finished product has a sufficiently high commercial value.

Method of extraction by absorption and desorption have a main defect which is obvious, in that the methods are inadequate by themselves and have to be used in combination with one of the two aforementioned methods of extraction in order to obtain satisfactory results. The absorption and desorption methods are at present confined to laboratory scale use.

We have now discovered that when sodium sulphate is used as the precipitating agent under defined operating conditions, it brings about selective precipitation of the organic compounds having enzymatic activity. The compounds are easily extracted by use of a filtration adjuvant and the products having a well-defined composition and high activity. To be suitable, the adjuvant should satisfy the following conditions:

(a) It should be compatible with the subsequent use of the composition in which it is to form part of.
(b) It should be practically insoluble in the medium to be filtered.
(c) It should itself be easily filtered.

Theoretically, a number of compounds appear suitable, but we have found that calcium sulphate is most advantageously used.

According to the present invention, therefore, we provide a method of preparing an active enzymatic powder from a culture of *Bacillus subtilis*, which comprises the steps of:

(a) Precipitating the enzyme from a nutrient broth of the purified culture by means of sodium sulphate,
(b) Vacuum-filtering the resulting flocculate on a filter having a pre-coated filter bed using calcium sulphate dihydrate as a filtration adjuvant, and
(c) Scraping a surface layer off the filter bed to obtain the dry product having a degree of activity determined by the thickness of the layer.

More precisely, the precipitation with sodium sulphate is performed so as to obtain a minimum concentration of 28% at a temperature between 28 and 60° C., preferably between 35 and 40° C., and at a pH between 6 and 11, preferably between 6.5 and 8.

The invention also provides firstly the flocculate obtained by working the first stage of the method and secondly the dry product obtained from the complete method. The flocculate is characterized by a very high, constant enzymatic activity exceeding 6,000 units/mg. The activity is reduced to 4,000 units by the presence of part of the sodium sulphate, which crystallizes during the process of isolating the flocculate. Previous methods, using the same constant of mineral substances, give products whose phase activity does not exceed 1,500 units/mg., i.e. 25% of the theoretical activity.

The final dry product can be obtained with any desired degree of dilution, depending on the thickness of the scraped layer and its activity can be adjusted at will from 600 to 4,000 μ/mg.

The known mechanical methods previously described for purifying the broth are still incapable of eliminating peptides and other high molecular weight compounds producing turbidity in the broth, while simultaneously eliminating bacterial substances, i.e. spores, which are produced during fermentation and which generally have to be destroyed on the insistence of the users of these enzymatic powders.

We have also discovered that if a special flocculating agent is added to the fermented broth, an effluent is obtained after centrifuging which is clear, pure, substantially free from the aforementioned undesirable compounds, and is particularly suitable for the various stages of the method of this invention described above.

The flocculating agent used is a compound obtained by condensing ethylene oxide or propylene oxide on a long-chain fatty amine derivative, for example oleylamine or stearylamine.

The invention therefore relates to the addition of a compound of the formula:

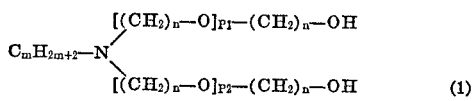

(1)

in which $m$ is an integer of from 16 to 18, $n$ is 2 or 3 and $P_1+P_2$ is from 3 to 10, to a crude fermentation broth of *Bacillus subtilis*, followed immediately by centrifuging of the treated broth and by the collection of the purified broth for treatment by the method according to the invention described above.

The advantage of using the above compounds as flocculating agents is that high molecular weight impurities are flocculated without precipitating the enzyme, the flocculation being accompanied by a bactericidal effect on the micro-organisms used for biosynthesis. In this connection, it is noteworthy that the previous methods used for purifying broths aimed at the first effect only, with the result that the ethylene oxide had to be purified from bacteria after extraction. This subsequent operation is made unnecessary by the present invention.

A typical compound having the aforementioned Formula 1 is the product known commercially as "Noramox," obtained by the condensation of ethylene oxide with oleylamine derivatives.

The invention has the following advantages:

The method can be used to separate all the required enzymatic compounds from a pure culture broth clarified by filtration, centrifugation or any other physical method. It yields highly active enzymatic powders independently of the specific activity of the clarified broth used as raw material. The method is remarkable for its ease of operation. The broths for treatment do not need to be concentrated beforehand since the enzymes are precipitated merely by adding sodium sulphate in a suitable concentration.

The flocculate obtained in the first stage is characterized by its high activity and the ease with which it can be filtered. It can therefore be filtered on an industrial filter having a precoated bed in conditions such that the final product is still highly active and can be used in the formulation of detergents.

The precipitate separated by filtration does not require any further purification and yields the final product directly, after drying and packing.

The precipitating agent can easily be recovered with a good yield by crystallizing the mother liquors merely by cooling them. Owing to its simplicity in operation, the method according to the invention requires relatively low investments compared with methods of extraction by acetone or by ammonium sulphate.

The products used for working the method have the advantage of being cheap, sodium sulphate is an abundant and inexpensive product and the same applies to calcium sulphate and other conventional adjuvants. Furthermore, the products are completely compatible with commercial compositions containing enzymes, and do not impart any unpleasant smell or other physical properties to them. Furthermore, in most cases the calcium ion portects the enzymes.

The product obtained under the conditions specified hereinbefore can be used for the formulation of detergents.

In order that the invention will be more fully understood, te following examples are given by way of illustration only.

EXAMPLE 1

2,800 grams of pure anhydrous sodium sulphate were added, with agitation and at a constant temperature, to 10 liters of clarified broth obtained by the aerobic fermentation of a pure culture of *Bacillus subtilis* (LPS 327 120) and having the following major properties:

| | |
|---|---|
| D.O. measured at 750 mμ | 0.37 |
| pH | 7.1 |
| Proteolytic activity units/ml. | 6,000 |
| T° ° C. | 35 |

A precipitate formed and was separated by filtration. After drying, 15 grams of a product having the following features were obtained:

| | Percent |
|---|---|
| Sodium sulphate content | 34 |
| Organic substance content | 66 |

The proteolytic activity was measured at pH 9 by the casein method and the liberated amino acids were determined by the Folin-Ciocalten method. Activity 4,000 u./mg.

EXAMPLE 2

3,000 grams of pure anhydrous sodium sulphate were added, with agitation and at a constant temperature, to 10 liters of broth which was clarified under the same conditions as in the preceding example but which had the following properties:

| | |
|---|---|
| D.O. measured at 750 mμ | 0.35 |
| pH | 7.3 |
| Activity units/ml. | 4,000 |
| T° ° C. | 31 |

After the flocculate had formed, the same method of separation was used as in the preceding example. After drying, 10.6 grams of a product having the following properties were obtained:

| | Percent |
|---|---|
| Sodium sulphate content | 38 |
| Organic substance content | 62 |

The activity, as measured previously: 3,800 u./mg.

EXAMPLE 3

3,500 grams of pure anhydrous sodium sulphate were added, with agitation and at a temperature of 45° C., to 10 liters of clarified broth obtained by fermenting a pure culture of *Bacillus subtilis* (LPS 327 400) having the following properties:

| | |
|---|---|
| D.O. measured at 750 mμ | 0.29 |
| pH | 6.2 |
| Activity units/ml. | 3,000 |

The precipitate obtained was separated by filtration and, after drying, 11.1 grams of a powder having the following composition were obtained:

| | Percent |
|---|---|
| Sodium sulphate content | 40 |
| Organic substance content | 60 |

Proteolytic activity, as measured previously but at pH 7: 2,700 units/mg.

EXAMPLE 4

3,500 grams of pure anhydrous sodium sulphate were added, with agitation at 38° C., to 10 liters of a medium which was identical with that in the preceding example and which had the following properties:

| | |
|---|---|
| D.O. measured at 750 m$\mu$ | 0.27 |
| pH | 6.4 |
| Activity at pH 7 (as measured previously) u./ml | 2,500 |

After filtration and drying, 9,250 grams of a powder were obtained having the following composition:

| | |
|---|---|
| Sodium sulphate content | 40 |
| Organic substance content | 60 |
| Proteolytic activity at pH 7 units/mg | 2,700 |

EXAMPLE 5

28% by weight of anhydrous sodium sulphate were added at 40° C. to a clarified broth obtained by fermenting a pure culture of Bacillus subtilis (LPS 327 120) and having the following properties:

| | |
|---|---|
| D.O. measured at 750 m$\mu$ | 0.31 |
| pH | 7.3 |
| Activity u./ml | 8,000 |

The suspension obtained was fed into a filter containing a pre-coated bed of calcium sulphate dihydrate and having a filtering area of 1 m.$^2$; the speed of rotation of the drum was 20 rotations per hour and the vacuum inside the drum was 200 torr. The calcium sulphate was scraped off at the rate of 750 grams per hour.

After 1 hour of operation, 500 liters of broth had been treated giving a powder which, after drying, had the following properties:

| | | |
|---|---|---|
| Calcium sulphate content | Percent | 42.8 |
| Sodium sulphate content | Percent | 19.5 |
| Organic substance content | Percent | 37.7 |
| Proteolytic activity at pH 9 | units/mg | 2,300 |

After one hour of operation, the depth of cutting was altered so as to remove 1,500 grams of calcium sulphate per hour.

Under these conditions, 500 liters of broth were filtered in 40 minutes and the resulting powder had the following properties after drying:

| | | |
|---|---|---|
| Calcium sulphate content | Percent | 50.3 |
| Sodium sulphate content | Percent | 16.5 |
| Organic substance content | Percent | 33.2 |
| Activity at pH 9 | units/mg | 2,000 |

EXAMPLE 6

A fermented broth having an enzymatic activity of 9,000 units/ml. and a turbidity of 3,600 degrees kaolin/ml. before the elimination of the bacterial substances, was separated by centrifuging both with and without the flocculant.

The results are given in the following table:

| | Turbidity of centrifugate After being separated for 30 minutes |
|---|---|
| Without flocculant | 530 |
| With flocculant (0.2% of volume of broth) | 90 |

EXAMPLE 7

15 kg. of "Noramox 05" were added with gentle agitation and at the natural pH to 10 m.$^3$ of broth obtained from the industrial fermentation of a medium containing a mixture of glucose and CSL (corn steep liquor) and having a proteolytic activity of 8,500 units/ml. The mixture was then left for 10 minutes and centrifuged at 30° C. on an Alfa Laval separator type DX309 at a feed rate of 5 m.$^3$/hour. The turbidity of the centrifugate varied from 100 to 120 degrees kaolin/ml.

After precipitation by sodium sulphate, the centrifugate was used to obtain an enzyme filtration rate of 500 liters per hour, per square meter of filter surface.

The same fermented broth was precipitated under the same conditions but was separated without the addition of the flocculant. The flow rates were reduced to 200 liters per hour, per square meter of filter surface.

EXAMPLE 8

The same operation was performed as in the preceding example, except that separation was continued up to the stage of the dry enzymatic powder suitable for commercial use. It was then found that a powder obtained from broth which had been separated in the presence of the flocculant contained only 5.10$^4$ bacteria/gram, whereas the powder isolated by the direct method contained 10$^8$ bacteria/gram. In both cases, the bacteria or spores were counted by spreading suitably diluted samples on Petri dishes.

EXAMPLE 9

Example 7 was repeated using a broth having the same composition and similar activity under the same conditions except that 10 kg. of a polyoxypropylene derivative of oleylamine were added. The ratio of propylene oxide per mole of oleylamine was 3:1.

The results were substantially identical with those given in Example 7.

EXAMPLE 10

A whole broth is separated in two parts. The first one is treated by centrifuging just as it was.

The turbidity of the clear broth obtained is 855 kaolin units.

2 volumes of pure acetone are added to the clarified broth. After precipitation, the enzyme is isolated by filtration through a composite bed according to the invention. After drying at a low temperature, under vacuum, the enzymatic powder obtained has an activity of 1300 u./mg. The second fraction is centrifuged after addition of 1.5% of a flocculating agent as stated above. The turbidity of the centrifugate is 60 kaolin units.

The solution is treated under the same conditions as the first fraction. The dry powder enzymatic activity is 1900 u./mg.

What we claim is:

1. A method of preparing an active enzymatic powder from a culture of Bacillus subtilis, which comprises the steps of:
    (a) precipitating the enzyme from a nutrient broth of the purified culture by means of sodium sulphate,
    (b) vacuum-filtering the resulting flocculate on a filter having a pre-coated filter bed using calcium sulphate dihydrate as a filtration adjuvant, and
    (c) scraping a surface layer off the filter bed to obtain the dry product having a degree of activity determined by the thickness of the layer.

2. A method according to claim 1, which comprises treating the nutrient broth with sodium sulphate to give a minimum concentration of 28%, at a temperature of from 28 to 60° C., and at a pH of from 6 to 11.

3. A method according to claim 2, which comprises treating the nutrient at a temperature of from 35 to 40° C. and at a pH of from 6.5 to 8.

4. A method according to claim 1, which additionally comprises, prior to step (a), treating the nutrient broth with a flocculating agent having the formula:

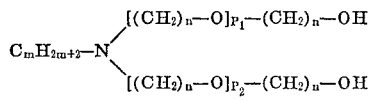

in which $m$ is an integer from 16 to 18, $n$ is 2 or 3 and $p_1+p_2$ is an integer from 3 to 10, and centrifuging the broth to remove the flocculate.

5. A method according to claim 4, in which the flocculating agent is a condensation product of ethylene oxide with a derivative of oleylamine.

References Cited

UNITED STATES PATENTS 3,574,120  4/1971  Siebert et al. _____ 195—66 R X
3,592,737  7/1971  Keay et al. _____ 195—66 R LIONEL M. SHAPIRO, Primary Examiner U.S. Cl. X.R.

195—68; 252—Dig. 12